July 26, 1966
J. W. HICKS, JR
3,262,251
GAS DIFFUSION CELL ELEMENTS
Filed March 6, 1962
3 Sheets-Sheet 1
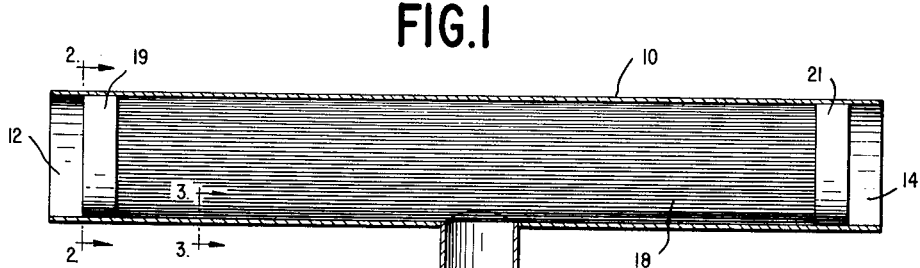
FIG.1
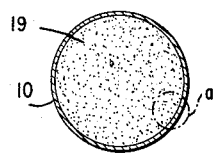
FIG.2
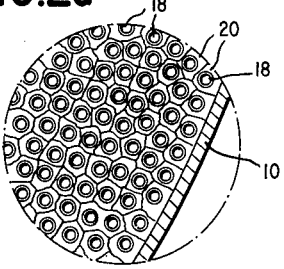
FIG.2a
FIG.3
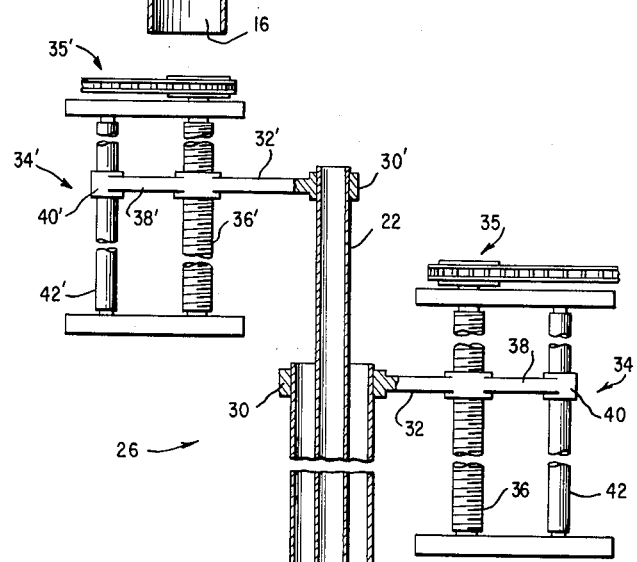
FIG.4
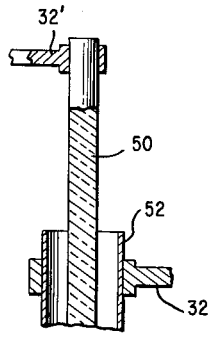
FIG.4a
INVENTOR.
JOHN W. HICKS, JR.
BY Stowell + Stowell
ATTORNEYS July 26, 1966  J. W. HICKS, JR  3,262,251
GAS DIFFUSION CELL ELEMENTS
Filed March 6, 1962  3 Sheets-Sheet 2
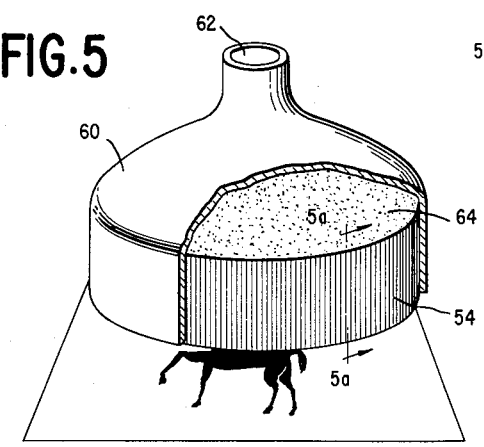
FIG.5
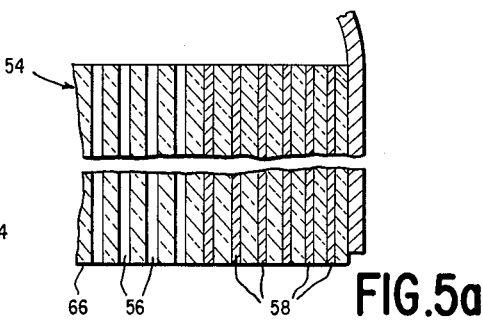
FIG.5a
FIG.7  FIG.7a
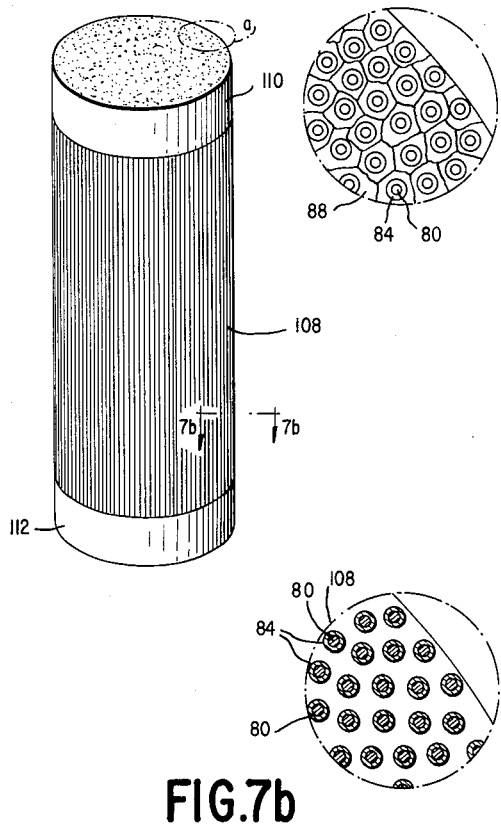
FIG.7b
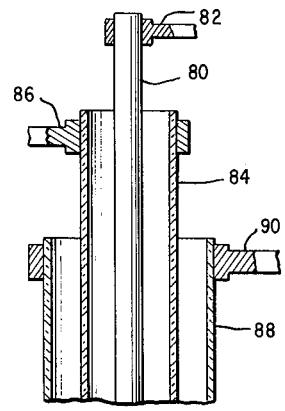
FIG.6
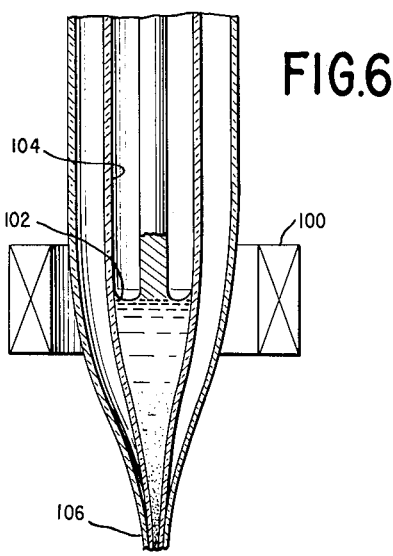
INVENTOR.
JOHN W. HICKS, JR
BY Stowell & Stowell
ATTORNEYS

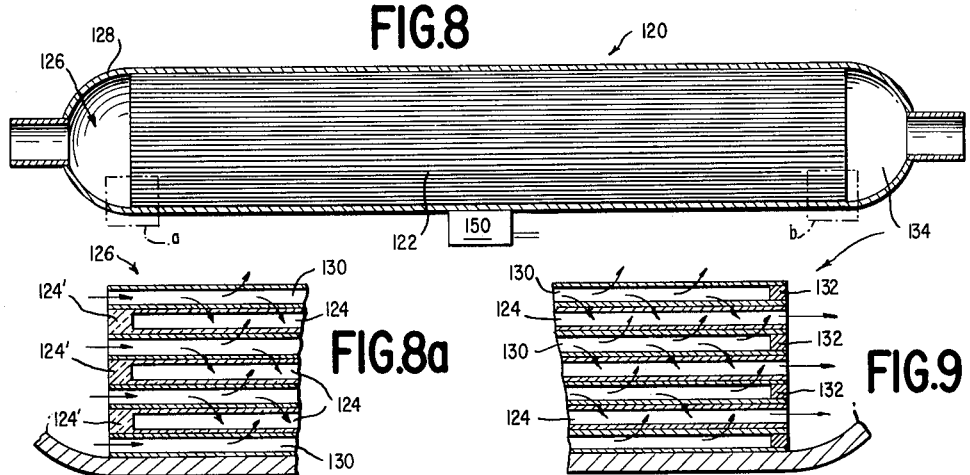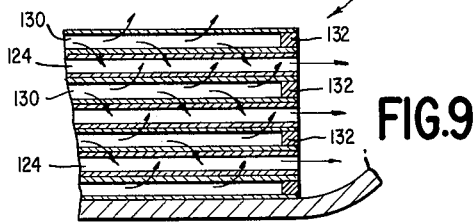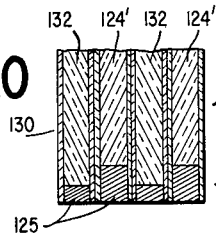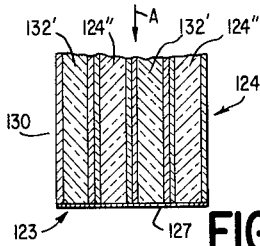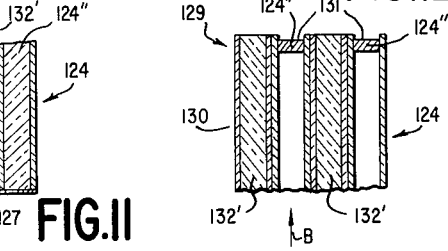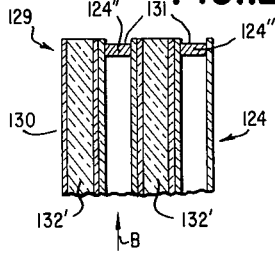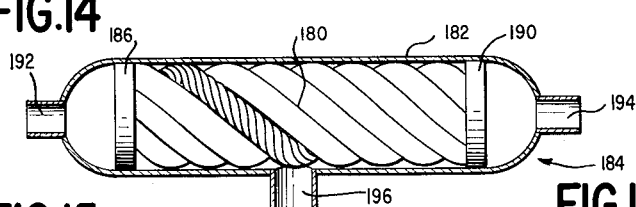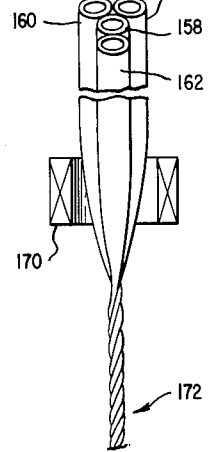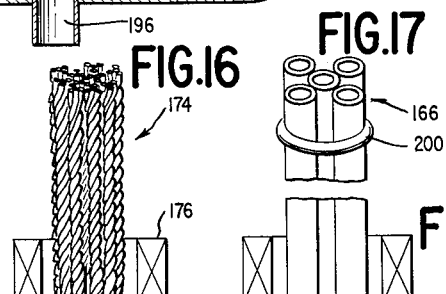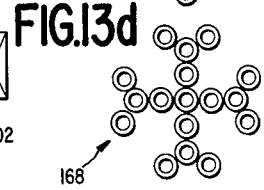

United States Patent Office 3,262,251
Patented July 26, 1966

3,262,251
GAS DIFFUSION CELL ELEMENTS
John W. Hicks, Jr., Fiskdale, Mass., assignor to Mosaic Fabrications, Inc., Worcester, Mass., a corporation of Massachusetts
Filed Mar. 6, 1962, Ser. No. 178,526
5 Claims. (Cl. 55—158)

This invention generally relates to improved fiber bundles.

Flexible and rigid bundles of relatively small glass tubes, rods and metal cored glass strands are finding increased commercial utilization as light and/or image and/or electrical energy transfer devices. Bundles of fine glass tubes have also been used in gas diffusion and purification chambers for separation and purification of, for example, helium from other gases.

Therefore, particular objects of the present invention are to provide improved fiber bundles.

These and other objects and advantages will be apparent to those skilled in the art from the following detailed description of the present invention when considered in view of the illustrations shown in the accompanying drawings wherein:

FIG. 1 is a longitudinal sectional view of a gas purification or diffusion cell employing an improved tubular glass fiber bundle as the gas diffusion element;

FIG. 2 is a section substantially on line 2—2 of FIG. 1;

FIG. 2a is an enlargement of the area designated a in FIG. 2;

FIG. 3 is a view of the tubular fibers illustrated in FIG. 2a substantially on section 3—3 of FIG. 1;

FIG. 4 is a diagrammatic fragmentary partial vertical sectional view of apparatus suitable for making tubular fibers for the apparatus shown in FIG. 1;

FIG. 4a is a fragmentary sectional view of a portion of the apparatus shown in FIG. 4 modified to produce glass-clad glass rods;

FIG. 5 is a perspective view in partial section of an improved printing plate constructed in accordance with the teachings of the present invention;

FIG. 5a is a greatly enlarged fragmentary section substantially on line 5a—5a of FIG. 5;

FIG. 6 is a fragmentary vertical sectional view of an apparatus for producing wire cored glass fiber elements;

FIG. 7 is a perspective view of an electrical conductive microwire fiber bundle;

FIG. 7a is an enlarged plan view of area A of the device shown in FIG. 7;

FIG. 7b is a view of the fibers shown in FIG. 7a substantially on line 7b—7b of FIG. 7;

FIG. 8 is a longitudinal sectional view of a modified form of gas diffusion or purification cell constructed in accordance with the teachings of the present invention;

FIG. 8a is a greatly enlarged sectional view of the area A of FIG. 8;

FIG. 9 is a fragmentary enlarged sectional view of the area B of FIG. 8;

FIGS. 10, 11 and 12 are diagrammatic illustrations of methods of end sealing alternate tubes of the structure shown in FIGS. 8, 8a and 9;

FIGS. 13a, 13b, 13c and 13d are plan views of multiple tube groups suitable for use in a modified form of gas diffusion and purification cells constructed in accordance with the teachings of the present invention;

FIG. 14 is a longitudinal sectional view of a gas diffusion or purification cell employing a plurality of the multiple tube groups illustrated in FIGS. 13a through 13d;

FIGS. 15 and 16 are diagrammatic views illustrating a method of making the cell illustrated in FIG. 14 employing a glass tube array as illustrated in FIG. 13b; and FIG. 17 is a diagrammatic view of another method of assembling and drawing groups of glass tubes for use in a gas diffusion or purification cell.

It has been known for some time that certain glasses are permeable to helium and are also permeable to some other gases such as hydrogen, xenon and the like, but at a far lower rate than helium. To other gases, such as oxygen, nitrogen, natural gas, and the like, these glasses are not permeable and the different diffusion rates of gases through walls of glass tubes provides an effective method of separation and purification of selected gases from host carrier gases. While, for example, helium will diffuse through certain glasses, the permeation rate of helium through glass is extremely small. Therefore, in order to produce a satisfactory diffusion cell, miles of glass tubing must be assembled and operated at high pressures and high temperatures to effect the separation of only a few cubic feet of gas per day. The rate of gas diffusion is in part directly dependent on the total surface area of the cell and inversely proportional to the wall thickness of the cell. These two geometrical factors are interrelated such that the same quantity of gas per unit length of tube will diffuse through various diameter tubes providing the ratio of wall thickness to diameter is maintained constant.

A diffusion cell containing 10,000 tubes .010 inch in diameter and one foot long can be arranged in a bundle about 1 inch in diameter. Operating such a cell at 200 atmospheres pressure and 400° C. in temperature, the cell will separate 5 cubic feet of helium gas from natural gas containing 1% helium in 24 hours. If the diameter of the tubes in such a cell were reduced to, for example, 1 micron with a corresponding reduction in tube wall thickness, a gaseous diffusion cell 1 inch in diameter would have an effective helium diffusion rate as much as $(10 \times 25)^2$ larger than the cell described above.

A gas purification or diffusion cell of this general order is illustrated in FIG. 1 and comprises a metal tubular jacket 10 having a gas inlet end 12, a gas outlet end 14 and a helium outlet 16 positioned intermediate the gas inlet and outlet ends. The metal tube 10 surrounds a plurality of individual glass tubes 18 having outside diameters in the range of about 7 microns and inside diameters of approximately 5 microns.

The fine glass tubes 18 are provided with tubular sleeves 20, see FIG. 2a, at their ends which tubular sleeves 20 are fused together to provide gas impervious end members 19 and 21 which, in turn, are suitably cemented to the inside wall of the metallic jacket 10. A gas containing helium entering the inlet end 12 under substantial pressure will, in flowing through the plurality of tubes 18, be stripped of a portion of the helium contained therein by diffusion of the helium through the walls of the tubes. The stripped helium may be withdrawn from within the metal jacket through the helium outlet 16 while the gas stream, with a portion of the helium removed, flows from the outlet end 14.

The bundle of gas diffusion tubes or fibers employed in the gas diffusion cell illustrated in FIG. 1 may be conveniently manufactured as illustrated in FIG. 4 by assembling a pair of glass tubes 22 and 24 in an apparatus generally designated 26 for controlled feeding of the pair of tubes 22 and 24 through a heating zone, defined by ring heater 28, where the pair of tubes are heated to a drawing temperature and drawn into a relatively small double walled fiber 44 as to be more fully described hereinafter. The tubes 22 and 24 are composed of glass having differing etching rates. The inner glass tube 22 may comprise, for example, #7070 Pyrex while the outer tube 24 may comprise one of the lanthanum silicate glasses which is readily chemically etched with nitric acid. A suitable lanthanum silicate glass for the tube 24 may comprise (percentage by weight) $SiO_2$, 12%; BaO, 47%; $B_2O_3$, 18%; $ThO_2$, 10%; $LaO_3$, 10%; iron and aluminum oxides, 3%.

A glass permeable to helium and not etched by nitric acid may comprise: $SiO_2$, 80.6%; $B_2O_3$, 13.0%; $Na_2O$, 3.8%; $K_2O$, 4%; $Al_2O_3$, 2.2%.

In a preferred embodiment, the ratio of the inside diameter of glass tube 22 to its outside diameter may be 1:1.2, and the ratio of the inside diameter of the outer tube 24 to its outside diameter may be in the order of 1.2:1.4.

A band 30 is secured adjacent the upper end of the tube 24 which band is secured to the extended end of an arm 32 forming the longitudinally movable member of the tube lowering mechanism 34. The feed mechanism 34 generally includes a lead screw 36 having one end connected to a suitable gear or gear and chain drive mechanism 35 which, in turn, is connected to a conventional variable speed control device and prime mover not shown in the drawings, whereby the glass tube 24 may be lowered through the heating zone adjacent the heater element 28 at a predetermined rate. The arm member 32 includes an extension 38 provided with a bearing element 40 which slidably engages a centering post 42 which prevents lateral or rotational movement of the arm 32.

The upper end of the glass tube 22 is engaged by clamping ring 30' which clamping ring is secured to an arm member 32' forming the movable element of the glass tube feeding mechanism generally designated 34'. The glass tube feeding mechanism 34', like feeding mechanism 34, includes a lead screw 36' drivably connected to a suitable prime mover and variable speed drive means through, for example, a gear and chain drive mechanism generally designated 35'. The assembly 34' also includes a guide rod 42', an arm extension 38' and a cylindrical bearing member 40' whereby the glass tube 22 may be progressively lowered through the heating zone defined by the heater 28 at a predetermined rate of speed which rate of speed may be different from the rate of lowering of the tube 24 through the heating zone whereby the operator may control the relative areas of the tube 22 and the cladding in the composite fiber 44 drawn from the pair of tubes.

In a suitable method of operating the device illustrated in FIG. 4, the drawing produces a hollow fiber 44 about .020 inch in diameter. The fiber 44 is cut into suitable lengths and the cut fibers are stacked, one on top of another, and redrawn through a heating zone to form a multiple fiber of approximately 50 tubes across its diameter, each fiber of which has approximately a 5-micron hole therein.

The redrawn multiple fiber is then cut into predetermined lengths, stacked one upon another, and the stacked multiple fibers are placed in, for example, a metal mold having a movable mold surface, heated to a fusing temperature and lightly pressed into a composite assembly.

The resulting assembly is then invested adjacent its ends 19 and 21 by, for example, dipping the ends of the composite unit in polyethylene wax. The invested assembly is then etched in one-half normal to two normal nitric acid. Etching is continued until the lanthanum glass tubes 24 have been etched from the tubes 22 between the invested ends 19 and 21. This etching produces an assembly of tubes having unetched ends 19 and 21 for assembly in, for example, a metal tube 10 as illustrated in FIG. 1.

With modifications, the above detailed process may be employed in the manufacture of highly uniform and efficient filters wherein the openings can be made with dimensions which are finer and more uniformly distributed than in conventional filters or such structures may be used as printing plates and as printed circuit boards in electrical and electronic devices.

Referring to FIG. 4a, an apparatus of the type illustrated in FIG. 4 is provided with a highly etchable, for example, lanthanum silicate glass rod 50 supported by arm 32' of the feed mechanism 34' while a tube 52 having a much lower rate of etching is supported from arm member 32 of the feeding mechanism 34. The rod 50 and tube 52 are progressively passed through the heating zone and a composite fiber is drawn therefrom. The composite fiber is cut, stacked and if the fibers are not of the desired diameter redrawn as discussed with reference to the method of making the gas diffusion cell shown in FIG. 1. A stacked and fused multiple fiber unit is then sliced transversely across the fibers into wafers which are then etched in nitric acid to remove the lanthanum silicate rods 50 from each fiber leaving a structure such as illustrated at 54 in FIGS. 5 and 5a composed of a plurality of openings 56 surrounded by a matrix of glass originally comprising tubes 52.

The sliced and etched wafers may then be mounted in suitable mounting means and employed as filter elements. By this method a greater hole ratio, up to 96% can be achieved whereas only about 30% to about 50% openings can be provided by drawing and fusing tubes into a filter assembly.

The cut and etched wafers may also be employed as novel printing plates by stopping off openings 56 as indicated at 58 to provide a predetermined pattern. The wafer is then mounted in a suitable header member 60 having an inlet opening 62 for directing printing ink to the upper surface 64 of the etched and stopped-off wafer 54. The openings 56 through the wafer 54 transfer the ink from the top surface 64 to the lower printing surface 66 by capillary action reproducing in printed form the indicia or image formed in the wafer by the cooperating openings and stopped-off areas.

Where the etched plates are employed as printed circuit boards, certain or all of the openings 56 are filled with an electrically conductive material whereby electrical connections may be made from one side of the printed circuit board to the other. It will also be appreciated by those skilled in the art that the above process may be employed in the manufacture of infrared face plates by filling the etched openings in the wafers with $AsS_3$, AgCl or germanium. These materials may be introduced in the capillary openings 56 by capillary action when the infrared transmitting materials are applied to one face of the wafers in a molten state.

By suitable modification of the process employed in constructing the bundle of tubular members employed in the gas diffusion cell illustrated in FIG. 1, the process may be employed for manufacturing a microwire bundle with each of the microwires being provided with an electrical insulating glass sleeve.

Referring to FIG. 6, a length of metal wire or rod 80 supported adjacent its upper end in a clamping device 82 forming one member of a controlled feeding mechanism such as shown in FIG. 4 is centrally positioned in a glass tube 84. The glass tube 84 is suitably supported by a clamping mechanism 86 which, in turn, is connected to a further feeding mechanism. The glass tube 84 is centrally supported within a further and larger diametered glass tube 88 which is also provided with a clamping ring element 90 having connection to a further feeding mechanism whereby outer tube 88, tube 84 centrally positioned therein, and metal rod 80 may be progressively lowered through the ring heater 100 which simultaneously heats the pair of glass tubes to a drawing temperature and also heats the metal rod 80 to a similar plastic state. Throughout the specification and claims, the term "plastic state" denotes a fluid condition of the metal and a workable condition of the glass. As illustrated in FIG. 6, as the metal rod 80 reaches the plastic state, it flows as indicated at 102 to form a pool of metal which contacts the inner surface 104 of the glass tube 84.

With the glass tubes 88 and 84 and the metal rod 80 in the plastic state, the composite stock is drawn to form a relatively small wire cored glass fiber generally indicated at 106.

The finished diameter of the metal cored glass fiber structure 106 is primarily determined by the rate of feed of metal and glass and the withdrawal rate of the composite material. Employing automatic forming machines as illustrated in FIG. 4 with separate feed mechanisms provided for the glass rods and the metallic member permits control of the proportion of metal and glass in the final product.

In the construction of the metal cored glass fiber members 106 the compositions of the pair of glass tubes 84 and 88, are selected to have different etching rates with the etching rate of the outermost glass tube 88 being substantially greater than that of the inner metal cladding glass tube 84.

Suitable compositions for the metal rod 80, the glass tube 84 and the glass tube 88 are as follows:

Metal rod: Percent
- Silver ———————————————————— 15
- Copper ———————————————————— 80
- Phosphorous ———————————————— 5

Glass tube 84:
- $SiO_2$ ———————————————————— 80.6
- $B_2O_3$ ———————————————————— 13.0
- $Na_2O$ ———————————————————— 3.8
- $K_2O$ ———————————————————— .4
- $Al_2O_3$ ———————————————————— 2.2

Glass tube 88:
- $SiO_2$ ———————————————————— 12
- BaO ———————————————————— 47
- $B_2O_3$ ———————————————————— 18
- $ThO_2$ ———————————————————— 10
- $La_2O_3$ ———————————————————— 10
- Iron and aluminum oxide —————————— 3

Starting with a metal rod having a diameter of about 3/32 of an inch, a glass tube 84 having an outside diameter of 1/4 inch, an inside diameter of 1/8 inch, and a glass tube 88 having an outside diameter of 1/2 inch and an inside diameter of 3/8 inch and heating the tubes and rod to a temperature of about 2200° F., the heated composition is drawn to provide a fiber structure having a metal core diameter of about .0012 inch.

The draughted composite member 106 is cut into portions of a suitable length and the portions are stacked so that the axis of the fibers lie generally in parallel relationship. The bundled fiber structures are heated to a temperature to soften the members and redrawn so that the wires are from about 5 to about .25 micron. The ends of the multiple fiber bundle are invested in, for example, a polyethylene wax as described with reference to FIG. 1 of the drawings and the invested fiber bundle is then etched in nitric acid to completely etch the outer glass sleeve 88 from each of the fiber members of the bundle to produce a structure such as shown in FIGS. 7, 7a and 7b consisting of a plurality of stranded electrically conductive wire elements 108 provided with insulating sleeves of glass 88 and end portions 110 and 112 maintaining the stranded microwires in an orderly array. The center portion or the ends of the fine wires can be exposed, if desired, by etching in hydrofluoric acid.

Other combinations for the wire core 80 and the glass insulating sleeves 84 are set forth in my co-pending application Serial No. 18.593, now abandoned, filed March 30, 1960, and entitled, "Metal Cored Glass Fiber Structure and Method of Making Same."

Referring to FIGS. 8, 8a, 9, 10, 11 and 12, there is illustrated a further form of the present invention which generally comprises a gas diffusion or separation chamber 120 wherein the members forming the separation element 122 comprise glass tubes 124 having their ends 124', adjacent the gas inlet end 126 of a chamber 128, closed as more clearly illustrated in FIG. 8a while cooperating tubes 130 have their opposite ends 132 sealed adjacent the gas outlet end 134 of the housing structure 128. In this form of the invention, a host gas containing a small percentage of helium entering the chamber 120 at inlet end 126 flows into the open end of tubes 130 and the helium contained therein passes through the tube walls into tubes 124 whereby the helium may be exhausted from the separation chamber 120 through outlet end 134.

In the construction of a gas diffusion cell wherein alternate or adjacent glass tubes of the cell have opposite ends sealed, a fiber bundle is constructed by drawing, stacking and fusing, and where necessary, redrawing, restacking and fusing a plurality of small diameter thin clad glass fibers wherein the small diameter rods 124' are composed of glass that is readily etched, the rods 132 are composed of glass that etches at a relatively slower rate and the sleeves or cladding 124 and 130 are relatively inert to the etching fluid.

It will be appreciated that the fibers having cores 124' may be scattered either at random among the fibers having cores 132 or the members may be arranged in a more or less regular geometric pattern including multiple concentric arrangements.

A suitable glass for rods 132 may have the following typical composition:

Percent by weight
- $SiO_2$ ———————————————————— 12
- $Al_2O_3$ ———————————————————— 3
- BaO ———————————————————— 48
- $B_2O_3$ ———————————————————— 17
- $La_2O_3$ ———————————————————— 20

A suitable glass for rods 124' may have the following typical composition:

Percent by weight
- $Al_2O_3$ ———————————————————— 10
- $B_2O_3$ ———————————————————— 50
- PbO ———————————————————— 40

One end of the bundle of clad rods is etched in dilute nitric acid until the faster etching glass, rods 124', are etched to a depth of, for example, a few thousandths of an inch. The etched end of the bundle is filled with an acid resistant material such as beeswax 125 and the end is ground and polished to line X of FIG. 10 whereby the slower etching glass 132 is exposed.

Glass rods 132 are then etched substantially throughout their length and then the faster etching rods 124' are etched from the opposite end of the bundle with dilute nitric acid. Etching of rods 124' is continued until only end plugs remain in tubes 124 as illustrated in FIG. 8a. Etching of rods 124' also etches rods 132 and the process is only efficient where the etching rate of rods 124' is substantially greater than the etching rate of rods 132. Where the etching rates of rods 132 and 124' are not substantially different, after the slower etching rods 132 have been etched substantially throughout their length the opposite end of the bundle is etched to a few thousandths of an inch in depth and this face is filled with beeswax and ground back to expose the slower etching rods 132.

A thin layer of sodium silicate is applied to the exposed faces of rods 132 and the coated end of the bundle is fired at a temperature of about 600° F. to harden the sodium silicate acid resist. Any remaining beeswax is removed from the second end of the bundle with gasoline, xylene or the like and the faster etching rods 124' are etched back to within a few thousandths of an inch of their ends to provide the structure 122 shown in FIG. 8.

The structure shown in FIG. 8 can also be readily constructed if rods 124' and 132 are formed from photosensitive glass of commercially known types which, if exposed to ultraviolet light and thereafter heated, the light exposed portions devitrify and may readily be etched.

Referring to FIG. 11, rods 124″ and 132' of the fiber bundle comprise photosensitive glass and rods 132' are relatively opaque to ultraviolet light while rods 124″ are relatively transparent to ultraviolet light. End 123 of the bundle of fibers is coated with a light sensitive photo-resist 127 and light is directed through the bundle in the direction of arrow A to expose the photo-resist 127 in contact with rods 124″. The photo-resist is developed and cleared from rods 132′ and the bundle is heated to a temperature approaching the annealing point of the photo-sensitive glass to devitrify the ultraviolet light exposed rods 124″. The rods 124″ are then etched from the opposite end substantially to the resist protected end 123.

The bundle is then re-exposed to ultraviolet light of a sufficient intensity to expose the relatively opaque rods 132′ and the bundle is reheated to devitrify the rods 132′.

The bundle is then etched from end 123 until the rods 132′ are etched back substantially to the opposite end to provide a gas separation unit substantially as shown at 122 in FIG. 8.

In FIG. 12 a further method of making the unit 122 is illustrated wherein photosensitive glass rods 124″ and 132′ are employed without a photo-resist.

In this form of the invention the bundle is exposed to ultraviolet light of an intensity to expose only rod 124″ which are then devitrified and etched in the direction of arrow B to leave a thin walled section at end 129.

The end 129 is then lightly etched as shown in FIG. 12 and the entire assembly is exposed to ultraviolet light of a sufficient intensity to expose the relatively opaque rods 132′ and the bundle is heated to devitrify the rods 132′.

An acid resist, such as beeswax, is applied to end 129 of the bundle to fill recesses 131 formed by the previous etch in rods 124″.

Devitrified rods 132′ are then etched from end 129 substantially to end 123 to provide a gas separation unit substantially as shown at 122 in FIG. 8.

The fiber bundle consisting of a plurality of tubes having alternate ends closed is mounted in the jacket 128. In this form of construction, since the carrier gas does not flow through the tubes 130, the pressure of the host gas is pulsated to maintain a flow of carrier gas within the tubes 130. Alternately, the entire cell 120 may be subjected to ultrasonic or sonic vibrations, the intensity and wavelengths of which is preferably adjusted in accordance with the permeation rate and depth, respectively of the cell. In FIG. 8, 150 designates a suitable electrically actuated sonic vibrator.

It will be appreciated that various modifications may be made in the process for alternately closing opposite ends of the tubes of the fiber bundle 122. For example, alternate tubes 124 and 130 may be constructed to have different inside diameters thereby effecting the capillary action of the tubes and after inserting the ends in liquid sealant material, a portion of the end is cut off above the sealed ends of the tubes having the larger diameters. Further, alternate tubes may be interiorly coated with fluxes to affect the surface tension of the glass on heating whereby alternate tubes would soften and close at different temperature ranges as the end of the fiber bundle is heated.

Gas diffusion cells may be constructed without etching or end sealing of the tubes of the bundle by constructing the fiber bundle from a plurality of multiple tube assemblies with the tubes of the assemblies being arranged in a geometric array to provide gas passages communicating with substantial portions of the outer surface of each of the tubes of the array. Devices and their methods of construction embodying the principle of this form of the invention are illustrated in FIGS. 13d through 13d, 14, 15, 16 and 17.

Referring to FIGS. 13a through 13d, there are illustrated examples of tube arrays providing a relatively open assembly of tubes suitable for grouping into larger bundles wherein communicating gas passages are provided between substantial wall portions of each tube of the array. In FIG. 13a, two tubes 152 and 154 are illustrated with the tubes being fused together along a common line 156. An array of four tubes is illustrated in FIG. 13b wherein a central tube 158 has fused thereto three additional tubes 160, 162 and 164.

FIG. 13c illustrates an open array 166 of five tubes while a more complex array 168 consisting of 17 tubes is illustrated in FIG. 13d.

The tubular arrays illustrated in FIGS. 13a through 13d are formed by drawing tubes through a heater zone such that threads of tubes are formed and fused one to the other in a predetermined pattern.

It will be appreciated by those skilled in the art that if the tube arrays illustrated by way of example in FIGS. 13a through 13d were stacked with other similar arrays, close packing of the subassemblies would destroy the desired open gas passages.

One method of maintaining the open gas passages after stacking a plurality of subassemblies is illustrated in FIG. 15 wherein tubes 158, 160, 162 and 164, grouped as illustrated in FIG. 13b are passed through a heating zone defined by heater 170, drawn, fused and twisted to provide a twisted multiple fiber group 172. The twist imparted to the tubes 158, 160, 162 and 164 maintains the general geometric arrangement of the tubes in a spiral configuration whereby when the multiple tube group 172 is cut to suitable lengths and stacked, an open array of all of the tubes is provided.

The stacked assembly of multiple tubes 172 may be maintained in a fiber bundle by suitable adhesives, cements or the like, applied to end portions of the multiple bundle to provide a gas diffusion cell consisting of a large number of fine tubes or a plurality of the twisted subassemblies may be grouped as illustrated in FIG. 16 at 174, heated by a heater 176, redrawn and retwisted as at 178 to provide an open rope-twisted assembly 180 illustrated in a jacket 182 of a gas diffusion cell 184 in FIG. 14 of the drawings.

In FIG. 14, opposite ends 186 and 190 are coated with an adhesive and sealed within the jacket 182 having a carrier gas inlet 192, a stripped gas outlet 194, and, for example, a helium outlet 196. The assembly 180 provided with the rope twist maintains an open array in that the subassemblies 172 are in contact with other members of the bundle only at spaced points and the gaps between those points of contact provide paths for gas flow from the innermost tubes of the structure whereby helium diffusing through the walls of the tubes may be readily withdrawn from the helium outlet 196.

Open arrays of multiple tube groups may be formed as illustrated in FIG. 17 without twisting and assembled into a multiple tube bundle while maintaining clear paths for gas flow between the plural tubes of the bundle by providing the assembly of tubes, for example, assembly 166 with spaced bands or collars 200 of glass fused to the assembly. During a subsequent drawing operation, through the heater zone 202, both the collars 200 and the tubes are correspondingly reduced in size. However, sufficient collars remain so that when an assembly of collared tubes is constructed from subassemblies 204, the bands or collars 200 maintains the tubes of the assembly in an open array whereby helium diffusing through the walls of the tubes may be collected at a common point.

The stacked assembly of tubes 204 may be further heated, drawn and fused together or the stacked assembly may be maintained in a bundle by applying a sealing material adjacent the ends of the bundle which sealing material may also support the tubes and provide high pressure seals for the cell.

From the foregoing description, it will be seen that the present invention provides improved methods of making fiber bundles and fiber bundle devices. While various methods and fiber bundle devices have been illustrated by way of example, other modifications and uses are contemplated as being within the scope of the present invention as defined in the appended claims.

I claim:

1. A gas diffusion device including a chamber, gas inlet and outlet means at opposite ends of the chamber, a gas diffusion element mounted in said chamber between the gas inlet and outlet means at opposite ends of the chamber, said gas diffusion element comprising a fused bundle of glass tubes maintained in a closely packed generally open array, the tubes of the open array being arranged such that fluid is maintained between a zone surrounding the periphery of the bundle of tubes and at least a substantial portion of the peripheral surface of each of said tubes of said fused bundle, gas barrier means adjacent opposite ends of said element and the inner wall of the chamber cooperating therewith to prevent passage of gas between the tubes, and further gas outlet means in said chamber between said gas barrier means communicating with said zone surrounding the periphery of each of said tubes.

2. A gas diffusion device including a chamber, gas inlet and outlet means at opposite ends of the chamber, a gas diffusion element mounted in said chamber between the gas inlet and outlet means at opposite ends of the chamber, said gas diffusion element comprising a bundle of glass tubes maintained in a closely packed generally open array, the tubes of the open array being arranged such that fluid is maintained between a zone surrounding the periphery of the bundle of tubes and at least a substantial portion of the peripheral outer surface of each of said tubes of said bundle, said bundle of glass tubes composed of a plurality of groups of tubes, each tube of each of said groups of tubes having a surface portion fused to at least one other tube of the groups of tubes, gas barrier means adjacent opposite ends of said element and the inner wall of the chamber cooperating therewith to prevent passage of gas between the tubes, and further gas outlet means in said chamber between said gas barrier means communicating with said zone surrounding the periphery of each of said tubes.

3. A gas diffusion device including a chamber, gas inlet and outlet means at opposite ends of the chamber, a gas diffusion element mounted in said chamber between the gas inlet and outlet means at opposite ends of the chamber, said gas diffusion element comprising a bundle of glass tubes maintained in a closely packed generally open array, the tubes of the open array being arranged such that fluid is maintained between a zone surrounding the periphery of the bundle of tubes and at least a substantial portion of the peripheral surface of each of said tubes of said bundle, said bundle of glass tubes composed of a plurality of groups of tubes, each tube of each of said groups of tubes being arranged in a generally open spiral array, and each tube of each of the spiral arrays having surface portion fused to at least one other tube of its array to maintain said closely packed bundle, gas barrier means adjacent opposite ends of said element and the inner wall of the chamber cooperating therewith to prevent passage of gas between the tubes, and further gas outlet means in said chamber between said gas barrier means communicating with said zone surrounding the periphery of each of said tubes.

4. A gas diffusion device including a chamber, gas inlet and outlet means at opposite ends of the chamber, a gas diffusion element mounted in said chamber between the gas inlet and outlet means at opposite ends of the chamber, said gas diffusion element comprising a bundle of glass tubes maintained in a closely packed generally open array, the tubes of the open array being arranged such that fluid is maintained between a zone surrounding the periphery of said bundle of tubes and at least a substantial portion of the peripheral surface of each of said tubes of said bundle, said bundle of glass tubes composed of a plurality of groups of tubes, each tube of each of said groups being arranged in a generally open array, each tube of each of the open arrays having a surface portion fused to at least one other tube of its array, and said groups of tubes being arranged in the bundle to maintain said generally open array and each group being maintained in said generally open array by being fused to contacting surface portions of other groups of the bundle, gas barrier means adjacent opposite ends of said element and the inner wall of the chamber cooperating therewith to prevent passage of gas between the tubes, and further gas outlet means in said chamber between said gas barrier means communicating with said zone surrounding the periphery of each of said tubes.

5. A gas diffusion device including a chamber, gas inlet and outlet means at opposite ends of the chamber, a gas diffusion element mounted in said chamber between the gas inlet and outlet means at opposite ends of the chamber, said gas diffusion element comprising a bundle of glass tubes maintained in a closely packed generally open array, the tubes of the open array being arranged such that fluid is maintained between a zone surrounding the periphery of said bundle of tubes and at least a substantial portion of the peripheral surface of each of said tubes of said bundle, said bundle of glass tubes composed of a plurality of groups of tubes, each tube of each of said groups being arranged in a generally open array, each tube of each of the open arrays being fused to contacting surface portions of other tubes of the group, a glass band surrounding each of said groups of tubes, and said groups of tubes being arranged in the bundle to maintain said generally open array, gas barrier means adjacent opposite ends of said element and the inner wall of the chamber cooperating therewith to prevent passage of gas between the tubes, and further gas outlet means in said chamber between said gas barrier means communicating with said zone surrounding the periphery of each of said tubes.

References Cited by the Examiner

UNITED STATES PATENTS

| | | | |
|---|---|---|---|
| 1,641,932 | 9/1927 | Reece | 65—50 |
| 1,707,729 | 4/1929 | Kelley | 101—401.1 |
| 1,751,584 | 3/1930 | Hamsell | 178—6 |
| 1,814,758 | 7/1931 | McCarthy | 101—401.1 |
| 1,834,604 | 12/1931 | Dahlgliesh | 165—157 |
| 2,261,262 | 11/1941 | Lewis | 65—52 |
| 2,328,302 | 8/1943 | Simison | 65—23 X |
| 2,355,373 | 8/1944 | Honkison | 210—185 X |
| 2,490,528 | 12/1949 | Kemmens | 65—23 |
| 2,556,616 | 6/1951 | Ellis | 65—62 X |
| 2,608,722 | 9/1952 | Stuetzer | 18—48 |
| 2,617,634 | 11/1952 | Jendrassik | 165—157 X |
| 2,752,731 | 7/1956 | Altossar | 65—23 |
| 2,765,524 | 10/1956 | Lenel | 29—424 |
| 2,911,057 | 11/1959 | Green | 55—158 |
| 2,915,806 | 12/1959 | Grant. | |
| 2,961,062 | 11/1960 | Hunter | 55—158 |
| 2,972,803 | 2/1961 | Koury | 29—155.1 |
| 2,974,404 | 3/1961 | Humenik | 29—157.3 |
| 2,992,586 | 7/1961 | Upton | 88—1 |
| 2,993,526 | 7/1961 | Young | 156—155 |
| 2,995,970 | 8/1961 | Hicks | 65—23 |
| 3,019,853 | 2/1962 | Kohman | 55—158 |
| 3,022,858 | 2/1962 | Tillyer et al. | 55—158 X |
| 3,037,265 | 6/1962 | Kollmeier | 29—155.5 |
| 3,119,678 | 1/1964 | Bazinet. | |

FOREIGN PATENTS 507,711 9/1920 France.
512,522 1/1955 Italy.
133,447 10/1951 Sweden.

REUBEN FRIEDMAN, *Primary Examiner.*

HERBERT L. MARTIN, *Examiner.*

R. HALPER, *Assistant Examiner.*